United States Patent [19]

Anderson et al.

[11] Patent Number: 5,492,364
[45] Date of Patent: Feb. 20, 1996

[54] RUPTURABLE PLASTIC HOUSING FOR AN AIR BAG INFLATOR

[75] Inventors: Steven J. Anderson; R. Mark Uzel; Steven Kmenta, all of Ann Arbor; Dennis W. Burnard, Roseville; Timothy E. Hughes, Livonia, all of Mich.

[73] Assignee: Automotive Systems Laboratory, Inc., Farmington Hills, Mich.

[21] Appl. No.: 290,241

[22] Filed: Aug. 15, 1994

Related U.S. Application Data

[63] Continuation-in-part of Ser. No. 55,667, Apr. 29, 1993, abandoned.

[51] Int. Cl.$^6$ ........................................ B60R 21/28
[52] U.S. Cl. ...................... 280/741; 220/589; 280/736; 280/737; 280/742
[58] Field of Search ........................ 280/736, 737, 280/740, 741, 742; 102/272, 273, 530, 531; 422/164; 220/414, 587, 588, 589

[56] References Cited

U.S. PATENT DOCUMENTS

| Re. 30,327 | 7/1980 | Damon | 280/740 |
|---|---|---|---|
| 3,810,655 | 5/1974 | Prachar | 280/150 |
| 4,414,902 | 11/1983 | Strasser et al. | 102/531 |
| 4,619,374 | 10/1986 | Yavorsky | 220/414 |
| 4,925,044 | 5/1990 | Hembert | 220/589 |
| 5,025,943 | 6/1991 | Forsman | 220/589 |
| 5,028,070 | 7/1991 | Bender | 280/741 |
| 5,046,429 | 9/1991 | Swann et al. | 102/530 |
| 5,149,129 | 9/1992 | Unterforsthuber et al. | 280/740 |
| 5,160,163 | 11/1992 | Castagner et al. | 280/740 |
| 5,201,542 | 4/1993 | Thuen et al. | 280/736 |
| 5,287,987 | 2/1994 | Gaiser | 220/589 |
| 5,294,151 | 3/1994 | Goode | 280/819 |

FOREIGN PATENT DOCUMENTS

| 1023592 | 3/1966 | United Kingdom | 220/587 |
|---|---|---|---|

*Primary Examiner*—Eric D. Culbreth
*Attorney, Agent, or Firm*—Lyman R. Lyon

[57] ABSTRACT

An inflator for an inflatable vehicle occupant restraint system comprises a plastic housing encased in fiber windings that is rupturable upon the production of a predetermined combustion gas pressure internally of the housing to effect venting of the gases into the air bag and inflation thereof.

1 Claim, 1 Drawing Sheet

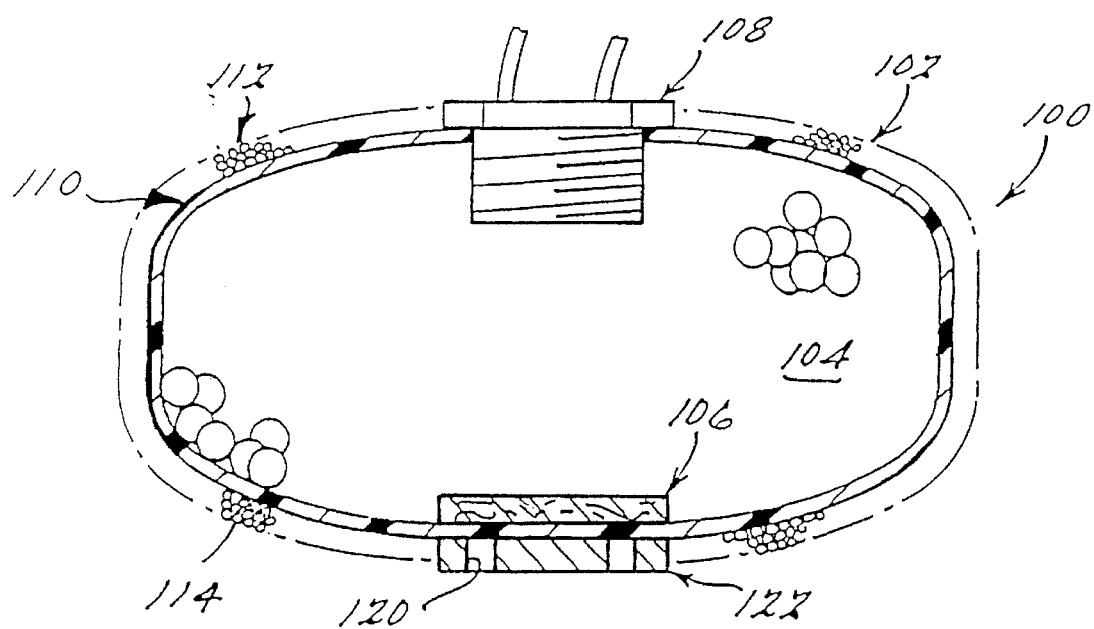

RUPTURABLE PLASTIC HOUSING FOR AN AIR BAG INFLATOR

CROSS-REFERENCE TO RELATED APPLICATIONS

This application is a Continuation-in-part of application Ser. No. 08/055,667, filed Apr. 29, 1993, entitled "Inflator", now abandoned.

BACKGROUND OF THE INVENTION

Inflatable vehicle occupant restraint devices, generally known as "air bags," have proved to be a life saving product. Since the inflator used in such inflatable occupant restraint systems is one of the heaviest and most expensive components of the air bag system, there is a need for a lighter, less expensive inflator.

Conventional air bag inflators are relatively thick walled due to the fact that wall thickness must be sized to contain the maximum gas pressure exhibited under the most adverse condition. Such inflators incorporate apertures for the discharge of gas produced by combustion of a propellant that are sealed from the ambient environment by discrete seals.

A typical inflator comprises a cylindrical perforated steel housing of a diameter and length related to the application. Typically, one or more layers of steel screen of varying mesh and wire diameter are disposed about an internally disposed propellant. Gases produced in the combustion process pass through the screen, then rupture the seals.

SUMMARY OF THE INVENTION

The solution to the problem of reducing air bag inflator weight and cost, in accordance with the present invention, is predicated on the concept of molding the inflator housing from plastic. Apertures necessary for the venting of gases are molded and have integral sealing diaphragms. Internal pressure affects rupture of the diaphragm as opposed to rupture of discrete seals.

The development of new composite materials, for example high temperature resistant graphite-reinforced composites such as polyether ether ketone (PEEK), allows the construction of the subject air bag inflator. The PEEK plastic generally has a filler material, for example glass or graphite fibers.

Advantages of the present invention are that screw threads, orifice holes with thin areas for burst shim/rupture disk effect, booster tubes with orifice holes, filter retention/locating grooves, and flanges with bolt holes for module mounting can be directly molded into the plastic with no post-molded machining operations.

Construction of the inflator in accordance with this invention comprises winding composite filaments about a mandrel. The mandrel upon which the filament is wound is preferably molded out of thermoplastic. The propellant and initiator can be installed before or after winding.

BRIEF DESCRIPTION OF THE DRAWINGS

FIG. 1 is a cross-sectional elevational view of a filament wound inflator in accordance with the present invention.

DETAILED DESCRIPTION OF THE PREFERRED EMBODIMENT

As seen in FIG. 1 of the drawing, a preferred embodiment of the present invention comprises an inflator 100 having four major components, namely, a housing 102, a propellant 104, a filter 106, and an igniter 108.

The inflator housing 102 is formed by encapsulating a molded plastic shell 110 by a wound fiber outer sheath 112. The outer sheath 112 is made from, for example, resin impregnated carbon fibers 114. The shell 110 functions as a mandrel for winding of the fibers.

The filter 106 comprises a fine wire mesh disc that overlies a plurality of apertures 120 in an orifice plate 122. The shell 112 is ruptured by gas pressure generated by the propellant 104. The aforesaid construction, results in a housing 102 that is hermetically sealed, relatively light and strong.

While the preferred embodiment of the invention has been disclosed, it should be appreciated that the invention is susceptible of modification without departing from the scope of the following claims.

We claim:

1. An inflator for a vehicle occupant restraint system comprising:

a hollow rupturable plastic inner shell;

a propellant in said inner shell capable of developing fluid pressure internally thereof sufficient to rupture said inner shell;

an outer shell comprising a plurality of resin impregnated carbon fibers wound about a major portion of said inner shell; and means for controlling the location of rupture of said inner shell comprising an orifice plate juxtaposed against an exterior surface of said inner shell and having a gas discharge orifice therein, the orifice in said orifice plate exposing the exterior of said inner shell to ambient pressure whereby controlled rupture of said inner shell occurs at said orifice upon the occurrence of a predetermined pressure differential across the portion of said inner shell underlying the orifice in said orifice plate.

* * * * *